(12) United States Patent
Schrey et al.

(10) Patent No.: US 7,186,965 B2
(45) Date of Patent: Mar. 6, 2007

(54) DISTANCE SENSOR AND METHOD FOR DETECTING A DISTANCE

(75) Inventors: Olaf Schrey, Ratingen (DE); Werner Brockherde, Duisburg (DE); Bedrich Hosticka, Duisburg (DE)

(73) Assignee: Fraunhofer-Gesellschaft zur Foerderung der angewandton Forschung e.V (DE)

( * ) Notice: Subject to any disclaimer, the term of this patent is extended or adjusted under 35 U.S.C. 154(b) by 0 days.

(21) Appl. No.: 11/410,720

(22) Filed: Apr. 25, 2006

(65) Prior Publication Data

US 2006/0214121 A1    Sep. 28, 2006

Related U.S. Application Data

(63) Continuation of application No. PCT/EP03/12007, filed on Oct. 29, 2003.

(51) Int. Cl.
*H01J 40/14* (2006.01)
(52) U.S. Cl. .................. 250/214 VT; 313/537
(58) Field of Classification Search ......... 250/241 VT, 250/207, 330; 313/527–530, 537, 542; 356/4.07, 5.01, 5.03, 5.08
See application file for complete search history.

(56) References Cited

U.S. PATENT DOCUMENTS

| | | | |
|---|---|---|---|
| 4,463,253 A * | 7/1984 | Lucht et al. | 250/214 VT |
| 5,519,209 A | 5/1996 | Rapoport et al. | |
| 5,870,180 A | 2/1999 | Wangler | |
| 5,977,705 A | 11/1999 | Sinor et al. | |
| 6,121,600 A | 9/2000 | Estrera et al. | |
| 6,400,396 B1 | 6/2002 | Bowker et al. | |
| 6,583,863 B1 | 6/2003 | Smith | |
| 2002/0117340 A1 | 8/2002 | Stettner | |
| 2003/0178983 A1 | 9/2003 | Ishida et al. | |

FOREIGN PATENT DOCUMENTS

| | | |
|---|---|---|
| EP | 1 152 261 A | 11/2001 |
| WO | 89 12837 A | 12/1989 |

OTHER PUBLICATIONS

English Translation of International Preliminary Examination Report; PCT/EP2003/012007; date Oct. 29, 2003.

(Continued)

*Primary Examiner*—Kevin Pyo
(74) *Attorney, Agent, or Firm*—Beyer Weaver LLP

(57) ABSTRACT

An indirect detection of the reflected radiation pulses, when measuring a distance by means of the photoeffect, allows considerably expanding the usability of the distance sensor and the distance measuring method, wherein the adaption to a new field of application only requires little design changes. Since in the external photoeffect the photoelectrons are ejected from the material irradiated photon by photon or quantum by quantum and the photons, when being ejected, only require a certain minimum energy and correspondingly the radiation used for irradiation only requires a sufficiently small wavelength, the external photoeffect allows detecting radiation over a large spectral range. When interferences occur in a certain wavelength range in a certain field of application, the operating wavelength range of the distance sensor technology may at first simply be set to another spectral range by using such an irradiation source having a spectrum outside the spectral range containing the interferences.

12 Claims, 8 Drawing Sheets

OTHER PUBLICATIONS

Schrey, O.M. et al.; "A 4x64 pixel cmos image sensor for 3d measurement applications"; SPIE, Sep. 16, 2003, pp. 333-336 XP010677477.

Hosticka, B. J. et al.; "CMOS Imaging for Automotive Applications"; IEEE Transactions on Electron Devices, IEEE Inc. New York, US, Bd. a50, Nr. 1, Jan. 2003; pp. 173-183 XP001170416; ISSN: 0018-9383.

Jeremias, R. et al.; "A CMOS Photosensor Array for 3D Imaging Using Pulsed Laser"; IEEE Int'l Sold State Circuits Conference; IEEE Inc. NY; Feb. 5, 2001, pp. 252-253, 452, XP002265916; ISSN: 0193-6530.

Santos Conde J. E. al: "A Smart Airbag Solution Based on a High Speed CMOS Camera System"; Image Processing, 1999. ICIP 99. Proceedings. 1999 Int'l Conference on Kobe, Japan Oct. 24-28, 1999; Piscataway, NJ, USA, IEEE, US. Oct. 24, 1999; pp. 930-934, XP010368821; ISBN: 0-7803-5467-2.

Cheung, Harry; "Sync Lite 2 Image Intensifier"; HTTP://home.fnal. gov/cheung/synclite/image_intensifier.htm, Sep. 3, 2002.

PCT Int'l Search Report; PCT/EP 03/12007; Apr. 23, 2004; In German.

\* cited by examiner

DISTANCE SENSOR AND METHOD FOR DETECTING A DISTANCE

CROSS-REFERENCE TO RELATED APPLICATION

This application is a continuation of copending International Application No. PCT/EP03/12007, filed Oct. 29, 2003, which designated the United States and was not published in English, and is incorporated herein by reference in its entirety.

BACKGROUND OF THE INVENTION

1. Field of the Invention

The present invention relates to distance measurements in general and to a distance measurement as may be employed in 3D cameras in particular.

2. Description of Prior Art

Image-capturing sensors offer a way of detecting a depth in a non-tactile way. This may, for example, take place using extremely short shutter times in near-infrared (NIR) light pulse runtime measurements. Today, for example, CMOS cameras having active NIR illumination detecting three-dimensional object information by means of pulsed electromagnetic radiation are available. Three-dimensional distance images of the object captured are generated by capturing an image with short exposure. An example of such a 3D sensor is described in DE 19757595 A1.

FIG. 9 is to illustrate the measuring principle of these 3D sensors. An optoelectronic CMOS sensor 902 the pixels of which may be read out at random and the integration time of which is adjustable pixel by pixel is used. Optics 904 images the object 906 to be measured onto the sensor 902.

The object 906 is illuminated by a pulsed light source 908 with one or several very short light pulses 910, whereupon light pulses of equal length are scattered back from the object 906. These light pulses scattered back are guided via the optics 904 to the CMOS sensor 902.

Due to the different distances of different object points to the sensor 902, the light impulses scattered back corresponding to these object points will arrive at the sensor at different times. In order to measure a distance, a time measuring or exposure window corresponding to a predetermined integration time is opened at the pixels of the sensor 902. Emission times and integration times are controlled and synchronized by control means 912. The first light impulse scattered back incident in the sensor 902 is absorbed more or less completely when the integration time matches the emission time. The light impulses arriving in a time-offset way due to the greater distance of the object point from the sensor 902 are not absorbed completely but cut off at the back. In this way, the different runtimes and thus the distances of the respective pixels from their object points may be determined using the different charges collected in the individual pixels of the sensor 902 during the integration time. A three-dimensional distance image can be calculated therefrom by the control or evaluating means 912.

The measuring system illustrated in FIG. 6 consequently combines extremely short shutter times with light pulse runtime methods. Using a CMOS camera according to FIG. 9, not only can cameras having intelligent pixels which, apart from the standard image capture, can also determine the presence of persons using movements or can even trace them using tracking be realized, but they also offer a way of realizing an optical depth measurement on the basis of the NIR runtime measurement, either for certain image areas or entire images. In this way, 3D-CMOS cameras able of combining 2D and 3D image shots may be realized.

By means of the method of the 3D distance measurement by means of CMOS image sensors, a user will particularly be able to electronically process three-dimensional image scenes in real time. The result of this is a number of fields of application. For example, three-dimensional inspection and placement systems depend on as many image information as possible for a reliable object recognition and classification. In automotive systems, the 3D distance measurement may take on monitoring tasks, such as, for example, interior recognition of motor vehicles including intelligent airbag triggering, theft protection, road recognition and early accident recognition. The 3D distance measurement may, however, also simply be used for topography measurements, as is shown in FIG. 6, or for recognizing persons or presence sensor technology. In particular in intelligent airbag triggering, the camera system, for example, has to solve the task of triggering the airbag with an offset intensity depending on the distance of the passenger. With 3D-CMOS image sensors, this is possible without causing problems. Industry thus has a high demand for such intelligent systems, which in turn means a considerable market potential for 3D cameras.

Existing 3D-CMOS image sensors for measuring distances or depths the measuring principle of which has been described referring to FIG. 6 largely are based on the functional principle of the active pixel sensor (APS). Here, as has been described above, the temporal opening of the exposure window or integration window of the pixel is synchronized with the pulsed resolution of the active scene illumination.

In order to illustrate this in greater detail, FIG. 10 shows the light intensity progress at the light source 908 and at two exemplary pixels of the sensor 902 in three graphs arranged one above the other, the x-axes of which represent the time axes and which are aligned to one another, and the y-axes of which represent the intensity of the pulsed reflected light at the position of the pixel in random units or the presence thereof. In the top graph, two successively emitted light impulses 920 and 922 are illustrated. In a way synchronized by the controller 912, an integration or exposure window is opened in the pixels of the sensor 902 simultaneously with the emission and having the same duration, in which the photocurrent generated therein is accumulated, as is indicated in the two bottom graphs 924 and 926 by broken lines, wherein the center graph indicates light received at a pixel 1 and the bottom graph indicates the light received at another pixel 2. The two reflected light pulses 928 and 930 resulting from the pulses 920 and 922 at the pixel 1 may be recognized in the center graph. As can be seen from the bottom graphs, the reflected light pulses 932 and 934 resulting at the other pixel 2 only arrive at the sensor 902 after a greater runtime difference $t_{D2}$ than the runtime duration $t_{D1}$ at the first pixel 1. The different overlapping of the reflected light pulse at the respective pixel with the exposure windows 924 and 926 results in different accumulated charges at the pixels which are read out at the end of each exposure window 924 and 926, respectively. In particular, the charge quantities $Q_1$ (pulse 1) and $Q_1$ (pulse 2) at the pixel 1 are greater than the charge quantities $Q_2$ (pulse 1) and $Q_2$ (pulse 2) at the pixel 2. Directly before each exposure window 924 and 926, the corresponding pixel is reset, a process in which the charge of the corresponding pixel is preset to a reference value or in which the capacitor pertaining to the photodiode of the pixel is charged to a predetermined value.

As has been described above referring to FIG. 6, the distances of the corresponding object point imaged onto the respective pixel should be determinable from the charge quantities $Q_1$ and $Q_2$ which correspond to the charge carriers generated due to the reflected light pulse, since the charge quantity Q basically linearly depends on the runtime offset $t_{D1}$ and $t_{D2}$ and these in turn depend, by $2R/v_c$, on the distance R, $v_c$ representing light propagation speed in the propagation medium and, in air, roughly corresponding to the speed of light c, so that the following applies:

$$Q \propto 2R/v_c$$

However, different problems result in deviations from the theory. When detecting the desired pulse light, a portion of undesired background light will also always be detected. Furthermore, the reflectivity of the scene object influences the portion of the light reflected. These factors sometimes considerably corrupt the useful signal, namely the charge quantities $Q_1$ and $Q_2$, depending on the distance of the object. In order to obtain uncorrupted distance information, correction measures are required. The DE 19757595 A1 mentioned above suggests capturing two shots for normalizing surface reflection, namely one with the short photo-capturing time described above and another one with a sufficiently long photo-capturing time to detect the reflected pulses in their entirety in the exposure window, wherein the difference of the two shots, divided by the shot with long exposure, results in a normalized distance image. It is suggested to suppress background light to perform another short-time and long-time measurement in addition to the above short-time and long-time measurements, but without illumination, and to subtract these shots from the corresponding one even before calculating the normalized distance image.

In spite of these corrections, it is necessary for a sufficiently high precision of the distance measurement to accumulate entire pulse sequences on the pixel structure to achieve a useful signal-to-noise ratio in this way. However, this limits the bandwidth of the system.

It is of disadvantage in the measuring system illustrated above that it cannot operate with sufficient reliability in all fields of application. In particular in intelligent airbag triggering mentioned above and in road recognition, high reliability demands are made to the distance system. When an airbag is not triggered, this might have fatal consequences, as does a malfunction in road recognition. The 3D-CMOS distance measuring systems illustrated above, for example, only fulfill the reliability criteria required entailing high complexity because they are susceptible to fog or rain situations and thus are not able to reliably determine the distance to the vehicle in front. The 3D-CMOS distance measuring systems illustrated above which typically operate with visible laser light or laser light active in the human eye with a wavelength of about 900 nm, would require, when externally monitoring a motor vehicle, much higher a pulse power to be able to reliably determine the distance, which is prohibitive for reasons of eye protection. In particular in airbag triggering where the person to be protected is illuminated, the demands on eye protection are a technological obstacle.

Apart from the CMOS photodiode arrays described above for detecting the reflected pulses, there are of course also other receiver arrays, such as, for example, CCD chips. DE 19927694 C1 suggests, for detecting faint objects, to receive radiation in a layer sequence of metal photocathode, vacuum region, multi-channel plate, vacuum region and conductive pixel surface layer patterned into pixel regions. A second conductive layer is provided in a way insulated from the first insulated layer to fill the gaps of the first layer in the lateral extension. In this way, corresponding to DE 19927694 C1, a semiconductor element below the layer sequence including the semiconductor structures therein is protected from the photoelectrons which are ejected from the photocathode by means of the photoelectrical effect and accelerated onto the pixel layer.

SUMMARY OF THE INVENTION

It is an object of the present invention to provide a distance sensor and a method for detecting a distance so that more variable ways of using same result starting from an increased reliability and/or precision.

In accordance with a first aspect, the present invention provides a distance sensor for detecting a distance to an object point, having: an electromagnetic radiation source for irradiating the object point by a radiation pulse in an irradiation time window; detection means for detecting electromagnetic radiation reflected from the object point in a detection time window which is in a predetermined temporal relation to the irradiation time window, wherein the detection means has: a photoelectrode for, in accordance with the external photoeffect, emitting photoelectrons responsive to the reflected electromagnetic radiation; and an electron detector for transforming the photoelectrons emitted to a detection signal indicating a quantity of the electromagnetic radiation reflected from the object point; and evaluation means for determining the distance to the object point from the detection signal, the detection means further having: a counterelectrode which, together with the photoelectrode, forms a capacity; means for connecting the counterelectrode to a predetermined potential before the detection time window and for separating same from the predetermined potential during the detection time window such that the capacity is discharged during the detection time window; means for connecting the photoelectrode to ground during the detection time window and to the predetermined potential after the detection time window; and means for reading out a voltage across the capacity after the detection time window to obtain the detection signal.

In accordance with a second aspect, the present invention provides a 3D camera for generating a distance image having a plurality of the above mentioned distance sensors, where the electromagnetic radiation source is formed by a common electromagnetic radiation source and the detection means are arranged in an array, and optics for imaging an object onto the array.

In accordance with a third aspect, the present invention provides a method for detecting a distance to an object point, having the steps of: irradiating an object point by a radiation pulse in an irradiation time window; detecting electromagnetic radiation reflected from the object point in a detection time window which is in a predetermined temporal relation to the irradiation time window, by means of a photoelectrode such that photoelectrons are emitted responsive to the reflected electromagnetic radiation according to the external photoeffect; and transforming the emitted photoelectrons to a detection signal indicating a quantity of the electromagnetic radiation reflected by the object point; and determining the distance to the object point from the detection signal, wherein the step of detecting has the following substeps: connecting a counterelectrode which, together with the photoelectrode, forms a capacity to a predetermined potential before the detection time window and separating same from the predetermined potential during the detection time window such that the capacity is discharged during the detection time window; connecting the photoelectrode to ground during the detection time window and to the predetermined potential after the detection time window; and reading out a voltage across the capacity after the detection time window to obtain the detection signal.

In accordance with a fourth aspect, the present invention provides a computer program having a program code for performing the above mentioned method when the computer program runs on a computer and/or on a corresponding digital or analog element.

The present invention is based on the finding that indirect detection of the reflected radiation pulses, when measuring the distance by means of the photoeffect, allows considerably expanding the usability of the distance sensor and the distance measuring method, the adaption to a new field of application only requiring small changes in the design.

Since in the external photoeffect the photoelectrons are ejected from the material irradiated photon by photon or quantum by quantum and the photons, when being ejected, only require a certain minimum energy and correspondingly the radiation used for irradiation only requires a sufficiently small wavelength, the external photoeffect allows making radiation detectable over a large spectral region. When disturbances occur in a certain wavelength region in a certain field of application, the operating wavelength region of the distance sensor technology may at first be set easily to another spectral region by using such an irradiation source having a spectrum outside the spectral region provided with the disturbances.

Although the external photoeffect generally allows a great spectral detection region, it is, however, possible by using a, for example, suitably doped semiconductor material to set the occurrence of the external photoeffect to certain narrow frequency regions or frequency bands by choosing suitable foreign atoms for doping. Thus, the signal-to-noise ratio between the useful signal, namely the reflected electromagnetic radiation pulse on the one hand and the background radiation on the other hand, can be kept small.

When an electron multiplier is used to multiply the photoelectrons emitted or ejected, the pulse widths can be kept smaller when measuring the distance, since the quantity of the electromagnetic radiation reflected from the object point per time unit results in more detectable electrons. In this way, the signal-to-noise distance between the useful radiation and the background radiation on the one hand and the signal-to-noise distance to the noise of the sensor or system electronics on the other hand can be increased. All in all, it becomes possible to perform distance measurements also in fields of application requiring a higher precision than is ensured by CMOS-photodiode-based distance sensors.

In addition, the intermediate step when detecting the reflected electromagnetic radiation by the external photoeffect, when integrating several inventive distance sensors to form an array of distance sensors, allows obtaining a higher resolution, which is how high-resolution 3D cameras can be obtained. The reason for this is that the photoelectrons emitted can easily be collected by a simple and very precisely structurable counterelectrode array assembly which, together with the photoelectrode, serves as a capacitor for storing the photoelectrons emitted and for accelerating the photoelectrons emitted by applying an acceleration voltage between the photoelectrode and the counterelectrode.

By means of being able to change the operating wave region, it is particularly also possible to also employ distance sensor technology in fields of application beyond FIR. Thus, it is possible to obtain, in fields of application where there are limits for the maximum allowed values for the intensity of the radiation used for irradiation due to the danger for the human eye over a great spectral (visible) region, an improved signal-to-noise ratio by displacing the spectral operating region from the visible spectral region, since in this case the irradiation intensity may be increased.

In other fields of application in turn, there is a limitation for the possible spectral operating region because in certain spectral regions, an absorption of the medium between object and sensor or reflectivity of the object in a certain spectral region is too high or too low. Certain liquid media, such as, for example, blood, tissue water, fog, humidity, etc. or smoke, for example, are transparent for long-wave light in the micrometer wavelength region, whereas they would weaken the operating radiation on the way from the sensor to the object and back to the visible region too much so that a sufficiently precise distance measurement or gap measurement cannot be performed.

BRIEF DESCRIPTION OF THE DRAWINGS

Preferred embodiments of the present invention will be detailed subsequently referring to the appended drawings, in which.

DESCRIPTION OF PREFERRED EMBODIMENTS

Figure 1:
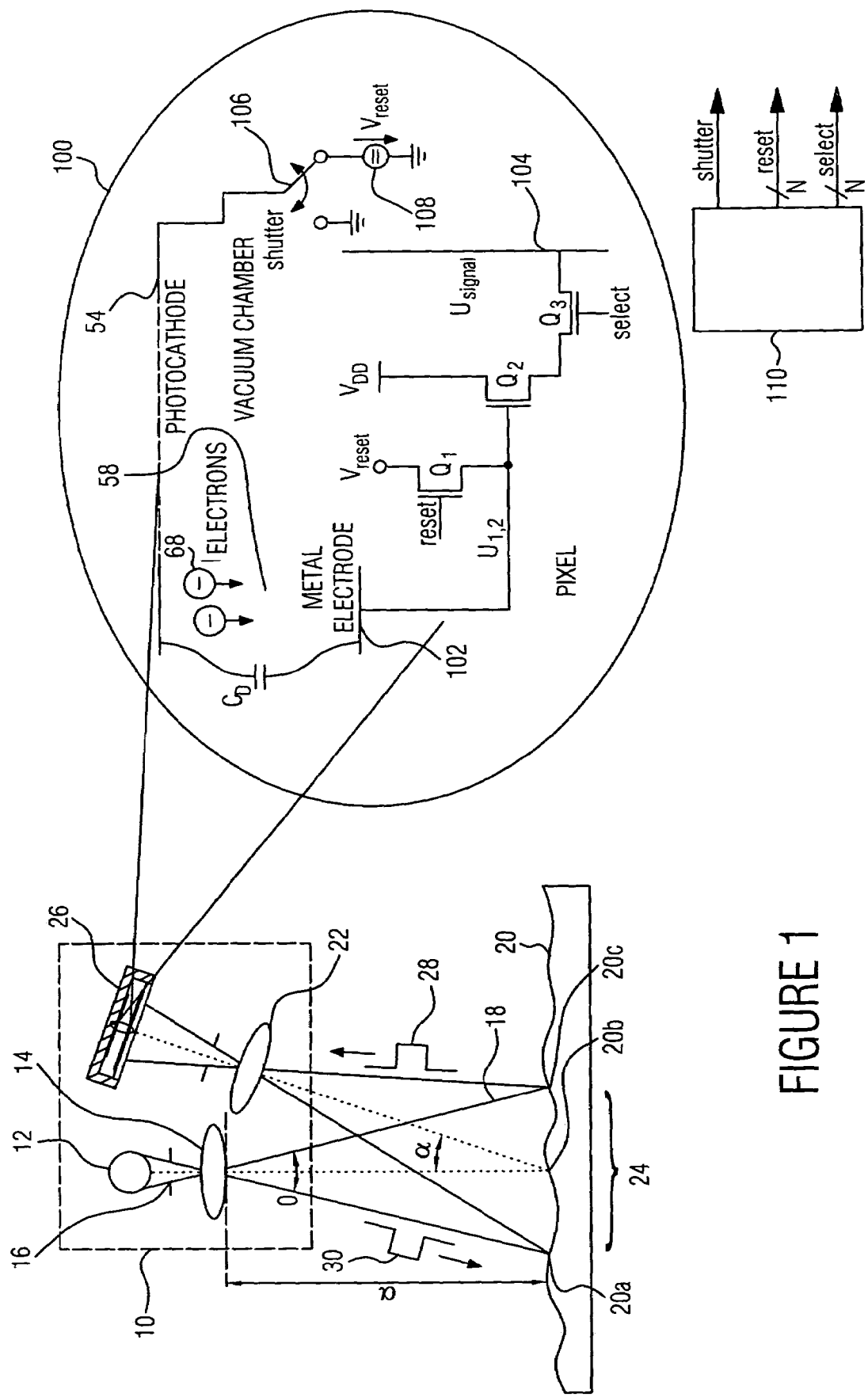
FIG. 1 shows a schematic drawing of a distance sensor according to an embodiment of the present invention.

With regard to the subsequent description, it is pointed out that same elements or elements corresponding to one another are provided with same or similar reference numerals in the figures and that a repeated description is omitted.

FIG. 1 shows a 3D distance sensor according to an embodiment of the present invention. The 3D distance sensor is generally indicated by 10. The distance sensor includes a radiation source 12 for electromagnetic radiation, irradiation optics 14 for expanding a beam 16 from the radiation source 12 to become an expanded light bundle 18 onto an object 20, receiving optics 22 for imaging the region 24 of the object 20 irradiated by the radiation source 16 onto a light-sensitive detection plane of pixel detection means 26 also included in the distance sensor 10.

The radiation source 12 could be any radiation source, such as, for example, an LED or a laser. To simplify the illustration, it will be assumed that the radiation source 12 is a laser emitting light in a spectral range from 800 nm to 3 μm, preferably from 2 μm to 3 μm, to render the distance sensor 10 in particular suitable for usages where the human eye must not be endangered, such as, for example, in airbag triggering, or where absorption disturbing the distance measurement or low reflectivity occur in the visible region, such as, for example, in road recognition, in motor vehicle distance recognition, in video endoscopy in the blood stream or the like.

The irradiation optics 14 may be any optics and, for example, comprise a beam-expanding negative lens. In the case of a different radiation source 12 than a laser, the optics 14 may, however, also comprise a beam-contracting positive lens. The material of the optics 14 should be adapted to the spectrum of the radiation source 12. In particular, the irradiation optics 14 may be refraction optics.

Although the distance sensor 10 is of course usable for all objects and the respective object 20 depends on the corresponding field of application of the distance sensor 10, characteristics of the object 20 nevertheless influence the signal detected by the detection means 26. The object 20 may, for example, have an object surface having the effect of a Lambert radiator, i.e. reflecting perpendicularly incident radiation such that it appears to have the same brightness looked at from all sides, or emits the intensity $I_0$ times cos α in all emitting directions α to the area normal, $I_0$ being the perpendicularly incident intensity. The influence of these object features on the measurement will be detailed subsequently.

The detection optics 22 can be set to a fixed focal length or have a variable focal length or be designed as a telephoto lens. The detection optics 22 thus images individual object points 20a, 20b and 20c on the surface of the object 20 onto image points in the image plane which forms the effective detection area of the detection means 26. Preferably, the imaged region of the image and the irradiated region 24 on the object 20 overlap essentially completely.

As will be explained below in greater detail, the detection means 26 receives reflected electromagnetic radiation pulses 28 reflected or scattered back from the surface of the object 20 upon irradiating it with radiation pulses 30 from the radiation source 12. As will be explained below in greater detail, the laser 12 emits the laser pulses 30 in irradiation time windows and the detection means 26 detects the quantity of incident light radiation in detection time windows synchronized with the irradiation time windows. In the actual measurement cycle, as will also be described in greater detail below, the irradiation and detection time windows are of equal length and without a time offset to each other. Since object points having a greater distance d to the sensor 10 have to cover a longer path distance between the laser 12 and the detection means 26, namely 2·d, than that having a smaller distance, the reflected light pulses 28 overlap to a lesser extent with the detection time windows and thus result in a smaller light quantity detected at pixels of the detection means 26 onto which the respective object point is imaged.

Put differently, the laser pulse 30 is reflected at the irradiated surface of the target object 20 and impinges on the photosensitive area of the detection means 26 after a runtime delay $t_{run}=2\cdot d/C_{light}$ ($C_{light}$ being the speed of light in the medium between the object 20 and the distance sensor 10) with the remaining energy $E_{laser}$. Depending on how great the distance d is, the point in time $t_{run}$ is shifted along the time axis t to the left or right. With an increasing distance, the delay time increases and the point $t_{run}$ is shifted to the right.

Figure 2:
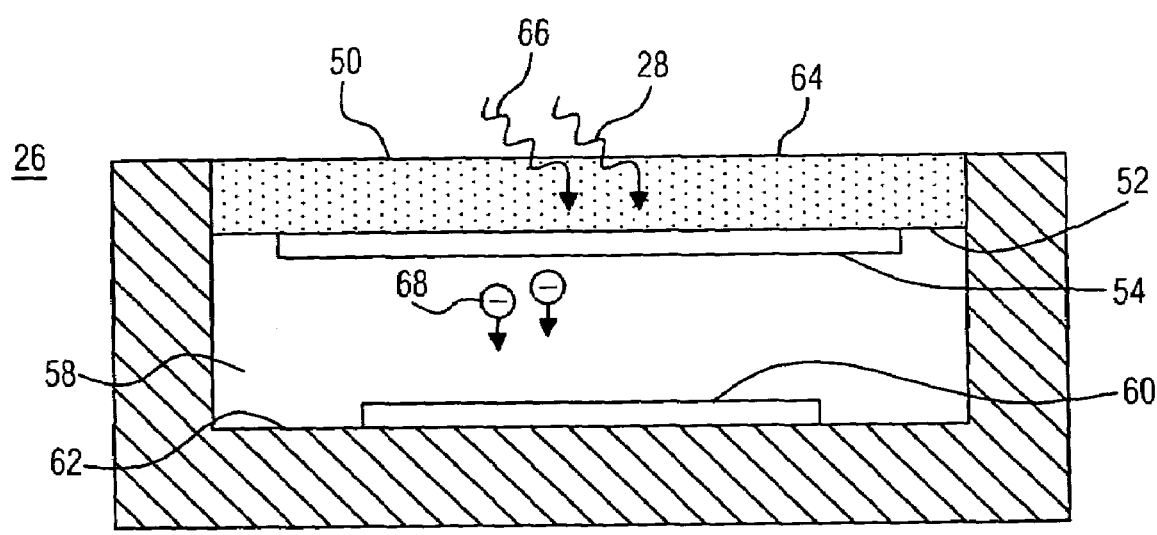
FIG. 2 is a schematic sectional view of the detecting means of the distance sensor of FIG. 1.

The actual detection process in the individual pixels of the detection means 26 of FIG. 1 will be explained subsequently in greater detail referring to FIG. 2. FIG. 2 shows the detection means 26 according to an embodiment of the present invention in greater detail. The detection means 26 includes an input window 50, for example made of glass, a photocathode 54 provided on the lower side 52 of the input window 50 for example by vapor deposition, a casing 56, for example made of ceramics, forming an internal air-tight sealed vacuum chamber 58 together with the input window 50 acting as a lid, and a semiconductor structure 60 exemplarily implemented in CMOS technology mounted to a bottom inside 62 of the casing 56 opposite the bottom or inside 52 of the input window 50 in a manner opposite the photocathode 54 across the vacuum chamber 58. The detection means 26 illustrated in FIG. 2 faces, with the top side 64 of the input window 50 opposite the bottom side 52, the irradiated object 20 (FIG. 1) across the detection optics 22 and the bottom side 52 or the interface between the input window and the photocathode 54 forms the light-sensitive detection plane mentioned before onto which the detection optics 22 images the object 20.

The reflected laser light 28, i.e. the useful signal, and background light 66 impinges on the photocathode 54 on the inner side 52 through the input window 50. Photoelectrons 68 are ejected from the photocathode material and emitted by the photocathode material by the external photoeffect. As is known, photons of the incident light 28, 66 discharge their energy to electrons in the photocathode 54 completely or partly, which thereupon leave the photocathode material when their energy exceeds a predetermined material-characteristic ejecting energy. As will be discussed below in greater detail, an acceleration voltage between the photocathode 54 on the one side and an array of counterelectrodes corresponding to the individual pixels of the detection means 26 on the other side is applied in the detection time windows such that the ejected photoelectrons 68 are accelerated in the detection time windows by a basically homogenous electrical field in the vacuum chamber 58 towards the semiconductor structure 60 or the counterelectrodes and thus cross the vacuum chamber 58 to the semiconductor structure 60. There, the electrons are collected in a pixel-resolved manner and transformed in a processable signal, as will be discussed in greater detail referring to FIG. 1.

It remains to be said that, in spite of the transformation of the useful signal 28 at the photocathode 54 to photoelectrons, the image resolution is kept, since photoelectrons 68 having been emitted laterally at a certain lateral position along the photocathode 54 will always only impinge on the semiconductor structure 60 at an impingement position unambiguously associated to this trigger position or a counterelectrode unambiguously associated to this position due to the acceleration voltage or the homogenous electrical field. In non-detection time windows there is, as will be explained subsequently in greater detail, no voltage or counteracting voltage between the electrodes 54 and 60 so that comparably few photoelectrons 68 reach the opposite semiconductor structure 60 in non-detection time windows.

As has been described before, an array of counterelectrodes forming a respective capacity together with the photocathode 54 is formed on a top side of the semiconductor structure 60, i.e. on the side facing the photocathode 54. A photocathode/counterelectrode pair represents a pixel from an array of pixels. FIG. 1 on the right side represents a pixel of the detection means 26 together with the pertaining control electronics, the pixel being indicated by 100. FIG. 1 illustrates the photocathode 54 common to all pixels, the counterelectrode 102 specifically associated to the pixel 100, and exemplary photoelectrons 68 crossing the vacuum chamber 58 from the photocathode 54 towards the counterelectrode 102 which are opposite each other across the vacuum chamber 58.

Three individual transistors Q1, Q2 and Q3 are specifically associated to the pixel 100, i.e. such transistors are also associated to any other pixel. The transistor Q1 is connected with its source/drain path between a voltage potential $V_{reset}$ and the counterelectrode which exemplarily is a metal electrode. A signal reset is applied to the control terminal of the transistor Q1. The counterelectrode 102 is also connected to a control terminal of the transistor Q2 connected as a source follower. In particular, the transistor Q2 connected as the source follower is connected with its source/drain path in series with a source/drain path of the transistor Q3 between a voltage supply $V_{DD}$ and a signal output 104 of the pixel 100, the transistor Q3 being connected to the output 104. A control terminal of the transistor Q3 is controlled by a signal select. Common for all pixels, but here illustrated for the pixel 100, a switch 106 is provided which in a manner controlled by a signal shutter optionally puts the photocathode to ground or a reference potential or the potential $V_{reset}$ which is related to the reference potential or ground and generated by a direct voltage source 108 connected between one of the two switch terminals of the switch 106 and ground.

The pixel-specific control signals reset and select and the control signal shutter common to all pixels are output by control means indicated in FIG. 1 by 110. In addition, FIG. 1 indicates that the counterelectrode 102 of the pixel 100, together with the photocathode 54, forms a capacity $C_D$ and that the output signal at the output 104 of the pixel 100 will subsequently be referred to by $U_{signal}$.

As will be discussed in greater detail subsequently referring to FIG. 3, the transistor Q1 is provided to positively charge the counterelectrode 102 directly before a detection time window starts by putting the counterelectrode 102 to the potential $V_{reset}$, whereas at the same time the switch 106 puts the photocathode to ground, wherein the control means 110 achieves these settings by suitably setting the control signals shutter and the pixel-specific control signal reset. The result is an acceleration voltage across the electrodes 54, 102. During the detection time window, the transistor Q1 separates the counterelectrode 102 from the potential $V_{reset}$. The acceleration voltage across the capacity $C_D$ at this point in time then decreases during the detection time window due to the photoelectrons 68 impinging on the metal electrode 102. At the end of a detection time window, the photocathode 54 is put to the potential $V_{reset}$ by the switch 106, wherein the voltage applied across the capacity $C_D$ counteracts photoelectrons 68 regarding an impingement on the counterelectrode 102 and, additionally, is a measure of the light quantity having impinged on the region of the photocathode 54 corresponding to the pixel 100 during the detection time window. The remaining voltage, which in FIG. 1 is referred to by $U_{1,2}$ is then read out via the transistors Q2 and Q3 and processed by an evaluation unit, which is not shown in FIG. 1 but the mode of functioning of which will be described referring to FIG. 3.

Figure 3:
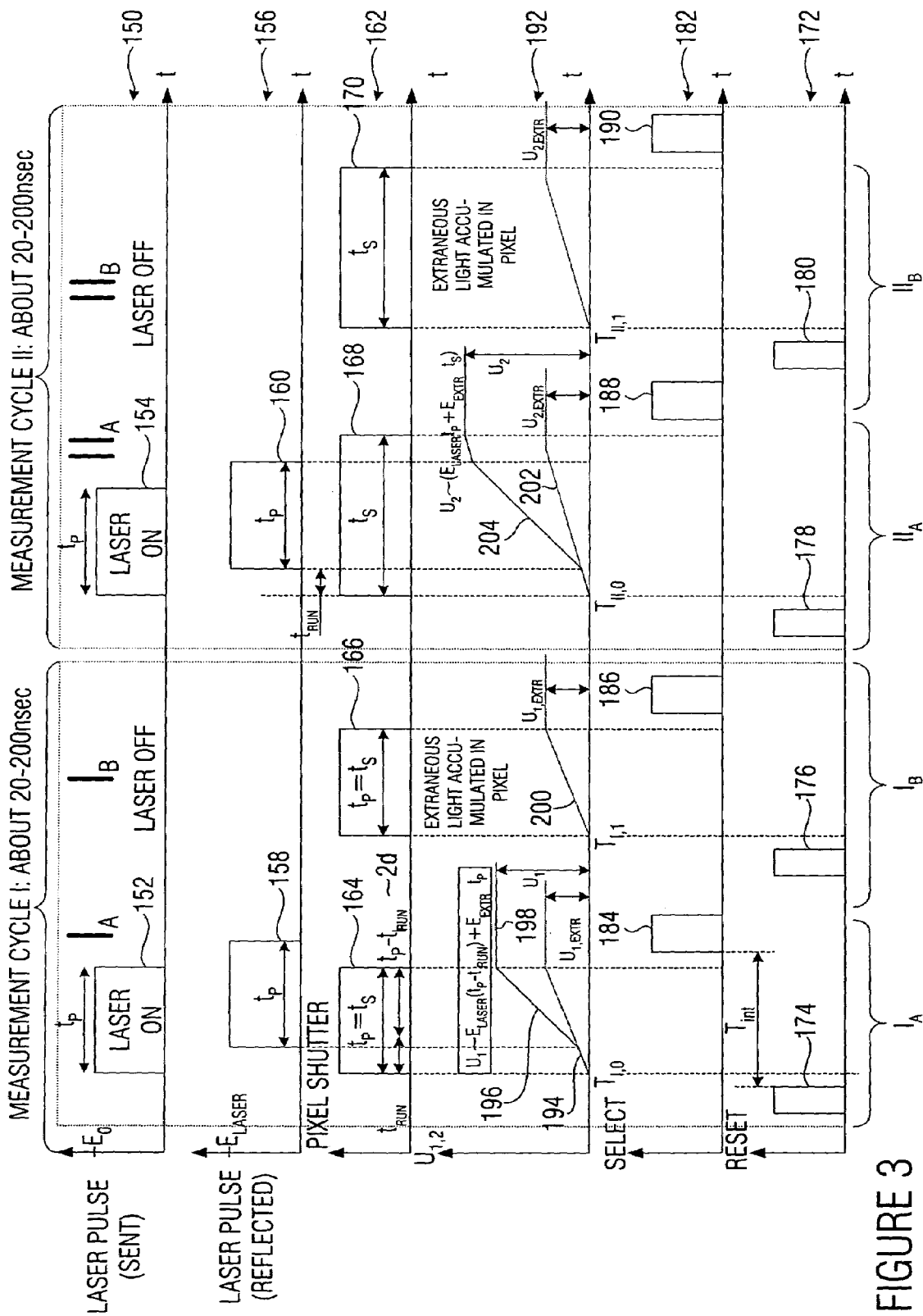
FIG. 3 shows exemplary waveforms existing in the sensor assembly of FIG. 1 using the detecting means of FIG. 2 according to an embodiment for a measurement sequence including background radiation correction and reflectance correction.

Referring to FIG. 3, the mode of functioning of the distance sensor 10 of FIG. 1 is subsequently described in greater detail according to an embodiment where the distance sensor 10 detects the distance d by means of four different successive detection cycles which differ in the duration of the detection time window or integration time and with regard to the on/off state of the laser 12.

FIG. 3 illustrates the four cycles which will subsequently more precisely be referred to as subcycles. In particular, FIG. 3 shows the time waveforms of different signals occurring in the distance sensor 10 during these four subcycles. The time waveforms are illustrated one below the other in six respective timing diagrams where the x-axis corresponds to the time t in arbitrary units. The time axes of all six timing diagrams indicate the same time section, i.e. are aligned with regard to one another. The braces indicate the four mentioned successive subcycles which, in the order of occurrence, are referred to by $I_A$, $I_B$, $II_A$ and $II_B$. As can be seen in the upper part of FIG. 3, the first two subcycles $I_A$ and $I_B$ will subsequently sometimes also be referred to as, in summary, measurement cycle I which exemplarily has a duration of about 20–200 nsec, whereas the two successive subcycles $II_A$ and $II_B$ will, in summary, be referred to as measurement cycle II which exemplarily also has about the same duration, namely 20–200 nsec.

In a top one of the six timing diagrams indicated by 150, the time waveform of the radiation flux of the optical power output by the laser 12 is shown, wherein the optical power is plotted in arbitrary units along the y-axis. As can be seen, the laser 12 is switched on and off in a pulse-like manner. The pulse durations are $t_P$. The optical power during the irradiation time window is set such that it results in an irradiation intensity $E_0$ in the irradiated region 24 of the object 20. The laser is off outside the light pulse. Two laser impulses 152 and 154 are included in the time section detected in FIG. 3. The laser pulse 152 is included in the subcycle $I_A$, whereas the laser pulse 154 is included in the subcycle $II_A$. No laser pulse is output in the subcycles $I_B$ and $II_B$. The measurement cycles I and II and thus also the laser pulses 152 and 154 are cyclically repeated with a predetermined repetition duration.

The laser pulses 152 and 154 of FIG. 3 emitted, which in FIG. 1 are indicated by 30, impinge on the surface of the object 20 and from there are reflected again and reach the detection means 26 after a runtime duration $t_{run}=2 \cdot d/c_{light}$. The time waveform of the optical power arriving at the detection means 26 at a pixel is illustrated in the second timing diagram 156 from the top in FIG. 3, wherein the optical power in the y-axis in turn is plotted in arbitrary units, wherein subsequently it will be assumed that the pixel is the pixel 100 of FIG. 1. As can be seen, reflected light pulses 158 and 160 arrive with a time offset $t_{run}$ and have the same pulse length $t_P$ like the pulse lengths when emitting. Subsequently, it will be assumed that the reflected light pulses 158 and 160 result in an irradiation intensity $E_{laser}$ at the corresponding pixel 100 due to the distance d and the reflectivity R of the object 20.

In a third time diagram 162 from the top, FIG. 3 shows the time waveform of the signal shutter serving to control the switch 106 or photocathode potential. The signal shutter at 162 is plotted in arbitrary units. When the signal shutter 162 at 162 is on the x-axis, the switch 106 is in the position shown in FIG. 1, i.e. the switch 106 biases the photocathode 54 to the potential $V_{reset}$. Otherwise, i.e. when the signal shutter at 162 is distant from the x-axis, the switch 106 is in the position not illustrated in FIG. 1, i.e. the photocathode 54 is put to ground. The points in time when the photocathode 54 is put to ground are the detection time windows of the detection means 26. As can be seen, in the four subcycles illustrated, there are four detection time windows 164, 166, 168 and 170, i.e. one per subcycle. The durations $t_S$ of the detection time windows 164 and 166 of the subcycles $I_A$ and $I_B$ equal the irradiation duration $t_P$, whereas the detection durations $t_S$ of the detection time windows 168 and 170 in the subcycles $II_A$ and $II_B$ are greater than $t_P$, preferably so great that $t_S \geq t_P + t_{run} + \Delta t$ is true for all distances allowed or expected, wherein $\Delta t$ indicates the time offset between irradiation time windows 152, 154 and detection time windows 164, 168, which in this case exemplarily is zero. The detection time window 164 and the detection time windows 164 and 168 from the measurement cycles I and II, respectively, are synchronized to the respective laser pulse 152 and 154 of the measurement cycle such that they start, with regard to same, without a time offset, wherein the synchronization is performed by synchronization means not shown in FIGS. 1–3.

The bottom of the six timing diagrams of FIG. 3 indicated by 172 represents the waveform of the control signal reset for the pixel 100 which at present is representative for the other pixels. The signal reset is always set to one of two logical states. In a first state which in FIG. 3 is illustrated at 172 such that the waveform of reset is on the x-axis, the transistor Q1 separates the electrode 102 from the potential $V_{reset}$. In the other logical state which in FIG. 3 is illustrated such that the signal reset is remote from the x-axis, the transistor Q1 conducts such that the electrode 102 of the pixel 100 is biased to the potential $V_{reset}$. The points in time where this happens are indicated in FIG. 3 by 174, 176, 178 and 180. They will always occur directly before the detection time windows 174, 176, 168 and 170 or at least in a temporal proximity thereto.

The timing diagram 182 additionally illustrates the time waveform of the control signal select for the pixel 100 presently considered. The signal select will always also take only one of two logical states, a first one which in FIG. 3 can be recognized by the signal select being on the x-axis, and the other one by the signal select being remote from the x-axis. In the first case mentioned, the transistor Q3 blocks, in the last mentioned case, the transistor Q3 conducts such that, as will be discussed below, the light quantity incident onto the pixel during a corresponding detection time window 164–170 can be deduced using the resulting output signal $U_{signal}$. The points in time where the transistor Q3 is switched to a conducting state are illustrated in FIG. 3 by 184, 186, 188 and 190. They will always follow the end of one of the detection time windows 164–170.

As is illustrated in FIG. 1, the signals shutter, select and reset, as are indicated by 162, 172 and 182, are controlled by the control means 110. This thus indirectly also controls the laser pulses 152–154 synchronized to the detection time windows 164–170. By the waveforms of shutter, select and reset, a signal $U_{signal}$ being a measure of the light quantity impinged on the corresponding pixel during the respective preceding detection time window results at the output 104 at the end of each detection time window 164–170 during the corresponding readout phase 184–190. The explanation is as follows. The metal electrode 102 is biased at or before the beginning of each irradiation process 152, 154 via the transistor Q1 to the starting potential $V_{reset}$ (174–180). Subsequently, the reset switch $Q_1$ is opened. At the same time or somewhat later, the detection time window 164–170 starts by putting the photocathode to ground, which is how the acceleration voltage forms. The incident electrodes 68 then discharge the capacity $C_D$ until the photocathode 54 at the end of the detection time durations 164–170 is deactivated again by setting signal shutter such that the photocathode is biased to the potential $V_{reset}$. The signal is then, after a certain duration $T_{int}$ which is about equal to or greater than the detection time window duration $t_S$, read out via the transistor Q3 after the end of the reset process 174, 176, 178, 180. The transistor Q2 connected as a source follower buffers the remaining voltage $U_{1,2}$ applied across the capacity $C_D$. The spatial distance detection only becomes possible by assembling the pixels as an array and by means of a synchronous irradiation of all receiving elements or pixels by the common shutter signal at the photocathode 54. This signal interrupts the electron stream 68 to the metal electrode 102 so that the instantaneous value of the light-proportional elementary charges accumulated on the metal electrode 102 are "frozen".

When the duration of the shutter signal $t_S$ equals the pulse width $t_P$, as is the case in the subcycles $I_A$ and $I_B$, the voltage $U_1$ on the capacitor $C_D$ represents a measure of the distance d of the pixel from its corresponding image or object point in the image scene. However, when the duration of the shutter signal $t_S$ is sufficiently greater than the pulse width $t_P$, as is the case in the subintervals $II_A$ and $II_B$, the voltage $U_{1,2}$ is a measure of the completely accumulated laser energy. This circumstance is, as will be discussed subsequently in greater detail, made use of to compensate reflectivities varying from pixel to pixel and opening pupils differing from pixel to pixel depending on the respective distance d of the object point corresponding to the pixel. In the measuring result obtained by the integration, the reflectance r of the illuminated object, the sensitivity of the photocathode R and the quantitative influence of external disturbances are included in addition to the distance. External "disturbances" in this context are, in particular, given by extraneous light portions having the energy $E_{extraneous}$, caused by unavoidable influence of the surrounding illumination.

In the remaining timing diagram 192 in FIG. 3, the time waveform of the voltage $U_{1,1}$ is illustrated, again in arbitrary units and without considering the sign. Actually, the timing diagram 192 represents, along the y-axis, a time waveform of the accumulated voltage across the capacity $C_D$ which forms in the course of each detection time window 164–170 due to the photoelectron impingement and is then frozen by switching off the acceleration voltage.

In the subcycle $I_A$ of the measurement cycle I where the shutter duration $t_S$ equals the illumination duration $t_P$ and a laser pulse 152 has been output, only disturbing background light accumulates on a pixel 100 considered from the reset point in time 174 on, more explicitly from the beginning of the detection time window 164 on, to the arrival of the reflected pulse 158, i.e. over a duration $t_{run}$. More explicitly, in this period of time of the length $t_{run}$, only disturbing background light results in photoelectrons 68 discharging the electrode 102. Thus, the discharge curve at 192 in this period of time 194 is at first flat. As soon as the reflected pulse 158 has arrived, not only the background light, but also the useful signal, i.e. the reflected pulse 158, contribute to the photoelectron generation and the discharge curve at 192 increases in this time section, as is indicated at 196, steeper than at 194. Then, at the end of the detection time window 164, the acceleration voltage across the capacity $C_D$ is switched off by the switch 106 connecting the photocathode to ground. Since there is no longer an acceleration voltage, hardly any photoelectrons 68 reach the counterelectrode 102, so that the voltage $U_1$ applied across the capacity $C_D$ after switching the switch 106 basically remains constant or is frozen from then on, as is indicated at 198. The voltage $U_1$ consequently is still applied at the point in time when the transistor Q3 at 184 is switched to be conducting so that the result at the output 104 is an output signal $U_{signal}$ proportional to the voltage signal $U_1$. At the end of the detection time window 164, after switching the switch 106, the voltage $U_1$ takes a value $U_{1,laser,extraneous}$ for which the following applies:

$$U_{1,laser,extraneous} = R \cdot r \cdot [E_{0,laser} \cdot (t_P - t_{run}) + E_{extraneous} \cdot t_P] \quad \text{Eq. 1}$$

$E_{0,laser}$ being the energy of the laser at the light impulse 152 or 152, $E_{extraneous}$ being the energy of the extraneous light or background light portion, $t_P$ being the irradiation duration which in the present case equals the detection duration, $t_{run}$ being the runtime of the light, r being the reflectance of the illuminated object 20 and R being a measure of the light sensitivity of the photocathode 54.

Equation 1 includes a runtime-depending portion and a portion depending on the extraneous light. In the cycle $I_B$, the measurement is repeated, however, without laser light. Since in this case only the background light contributes to a photoelectron generation, the gradient of the discharge curve in the cycle $I_B$ is flat, as is indicated at 200, namely as flat as is the case at 194. The remaining voltage $U_1 = U_{1,extraneous}$ at the electrode 102 appearing at the end of the detection time window 166 corresponds to:

$$U_{1,extraneous} = R \cdot r \cdot E_{extraneous} \cdot t_P \quad \text{Eq. 2}$$

Consequently, $U_{1,extraneous}$ only includes the extraneous light portion and thus also the signal $U_{signal}$ read out at 186. The results of the subcycles $I_A$ and $I_B$ are then subtracted from each other to eliminate the extraneous light portion. The result, not taking the proportionality of $U_{signal}$ into consideration, for the difference is:

$$U_{1,diff} = U_{1,laser,extraneous} - U_{1,extraneous} = R \cdot r \cdot E_{laser} \cdot (t_P - t_{run}) \quad \text{Eq. 3}$$

The difference calculation may, of course, take place in a digital or analog manner. When the semiconductor structure 60, however, is implemented in CMOS technology, it is practically possible to subtract the analog signals $U_{1,laser\ extraneous}$ and $U_{1,extraneous}$ directly on the chip or semiconductor structure 60 from each other with very high precision. For example, this takes place in a so-called circuit for a correlated double sampling or CDS stage.

Since the measurements in the subcycles $I_A$ and $I_B$ are in close temporal proximity, the extraneous light portions are correlated by nearly 100%, which is why equation 3 in the form illustrated is true. As can be recognized, equation 3 no longer includes an extraneous light portion. However, the reflectance r which may vary considerably from pixel to pixel, in the extreme case for the reflection by, for example, a factor of 1:40, and the sensitivity R of the photocathode which may vary from pixel to pixel due to manufacturing, are still included. These parameters are compensated in the measurement cycle II, as will be described subsequently. During the measurement cycle II, the difference value $U_{1,diff}$ or a corresponding proportional value is stored in the camera system, since in the subcycle $II_A$ the pixels and the CDS circuit mentioned above are reset for the next measurement cycle.

The measurement cycle II is basically identical with the measurement cycle I, except for the duration $t_S$ of the shutter signal 162: The shutter time window now is considerably longer than the duration $t_P$ of the laser pulse 154 so that the entire pulse form of the laser in the pixel is integrated. Thus, no more distance information d is contained in the signal $U_1$, since this is actually obtained by "cutting off" the laser pulse received by means of the shutter signal.

In the subcycle $II_A$, at first the photoelectrons generated by the background light accumulate over the duration $t_S$. This portion is indicated by the broken line at 202. During the time when the reflected light pulse 160 arrives, wherein this time section is completely within the time window 168, photoelectrons are additionally generated by the reflected laser pulse 160, which is why the gradient of the actual discharge curve in the subcycle $II_A$ during this time is greater than the contribution of the extraneous light portion 202, as is indicated at 204. At the end of the detection time window 168, a voltage $U_2$ at the capacitor $C_D$ is frozen after switching the switch 106 to ground, for which the following applies:

$$U_{2,laser,extraneous} = R \cdot r \cdot (E_{laser} \cdot t_P + E_{extraneous} \cdot t_S) \quad \text{Eq. 4}$$

Like in the measurement cycle I, in the measurement cycle II the subcycle $II_A$ is repeated in the subcycle $II_B$, however this time without a useful signal or laser pulse such that laser and background portions are not captured as is the case in the subcycle $II_A$, but only the extraneous light portion so that the result at the end of the detection time window 170 is a voltage $U_{2,extraneous}$ across the capacity $C_D$, for which the following applies:

$$U_{2,extraneous} = R \cdot r \cdot E_{extraneous} \cdot t_S \quad \text{Eq. 5}$$

Again, the two values are exemplarily subjected to a difference calculation in the CDS stage mentioned above so that the result is a value $U_{2,diff}$ or a respective proportional value, namely:

$$U_{2,diff} = U_{2,laser,extraneous} - U_{2,extraneous} = R \cdot r \cdot E_{laser} \cdot t_P \quad \text{Eq. 6}$$

The two difference calculations mentioned before are performed in an evaluation unit which is not shown in the figures and, if appropriate, comprises the CDS stage mentioned above. The evaluation unit forms the quotient of the results of equation 3 and equation 6, having the following result:

$$\frac{U_{1,diff}}{U_{2,diff}} = \frac{(t_P - t_{run})}{t_P} \quad \text{Eq. 7}$$

Using the context $t_{run} = 2 \cdot d / c_{light}$ and under the precondition that the laser source 12 and the detection means 26 have the same distance d to the object 20, the final result for the distance $d_{x,y}$ of the respective pixel considered (x, y), x and y exemplarily indicating a line and column index, respectively, from its corresponding object point 20a–20c in the scene is:

$$d_{x,y} = \frac{c_{light}}{2} \cdot t_P \cdot \left(1 - \left(\frac{U_{1,diff}}{U_{2,diff}}\right)_{x,y}\right) \quad \text{Eq. 8}$$

Evaluating means processing the output signals resulting in the subcycles $I_A$ to $II_B$ according to equations 3, 6, 7 and 8, which is not shown in the figures, consequently obtains for all pixels at pixel positions, i.e. for each pixel line x and each pixel column y, in which the pixels are arranged, a distance value $d_{x,y}$ which is background-light-compensated and reflectance-compensated.

In order to increase the sensitivity and thus increase the distance resolution, the measurement cycles I and II could each be performed several times in a row, wherein in the meantime the differences $U_{1,diff}$ and $U_{2,diff}$ are added and each stored in an analog storage on the chip. With N cycles of the cycle I, the distance resolution Δd thus improves by the factor root(N). For the sake of completeness, it is mentioned here that the laser energy decreases quadratically with the distance d from the laser source 12, which increases the requirements to the multiple-pulse capability of the system enormously.

Furthermore, referring to the description of FIG. 3, it is also pointed out that, apart from the extraneous light portions and the reflectance, at the same time the dark current portions and low-frequency noise portions caused by the semiconductor substrate or CMOS sensor 60 are compensated since they are still correlated with the laser source by the direct measurement after illumination.

Additionally, the embodiment described below, by means of an image enhancing assembly, offers a way of enhancing the electron stream in connection with an MCP and in this way to increase the signal-to-noise distance and thus the distance resolution.

Subsequently, referring to FIGS. 4 and 5, an embodiment of the present invention which differs from the embodiment of FIGS. 1–3 in the design of the detection means 26 and, more precisely, in adding MCP so that the detection means 26 acts as an image enhancer will be described.

Figure 4:
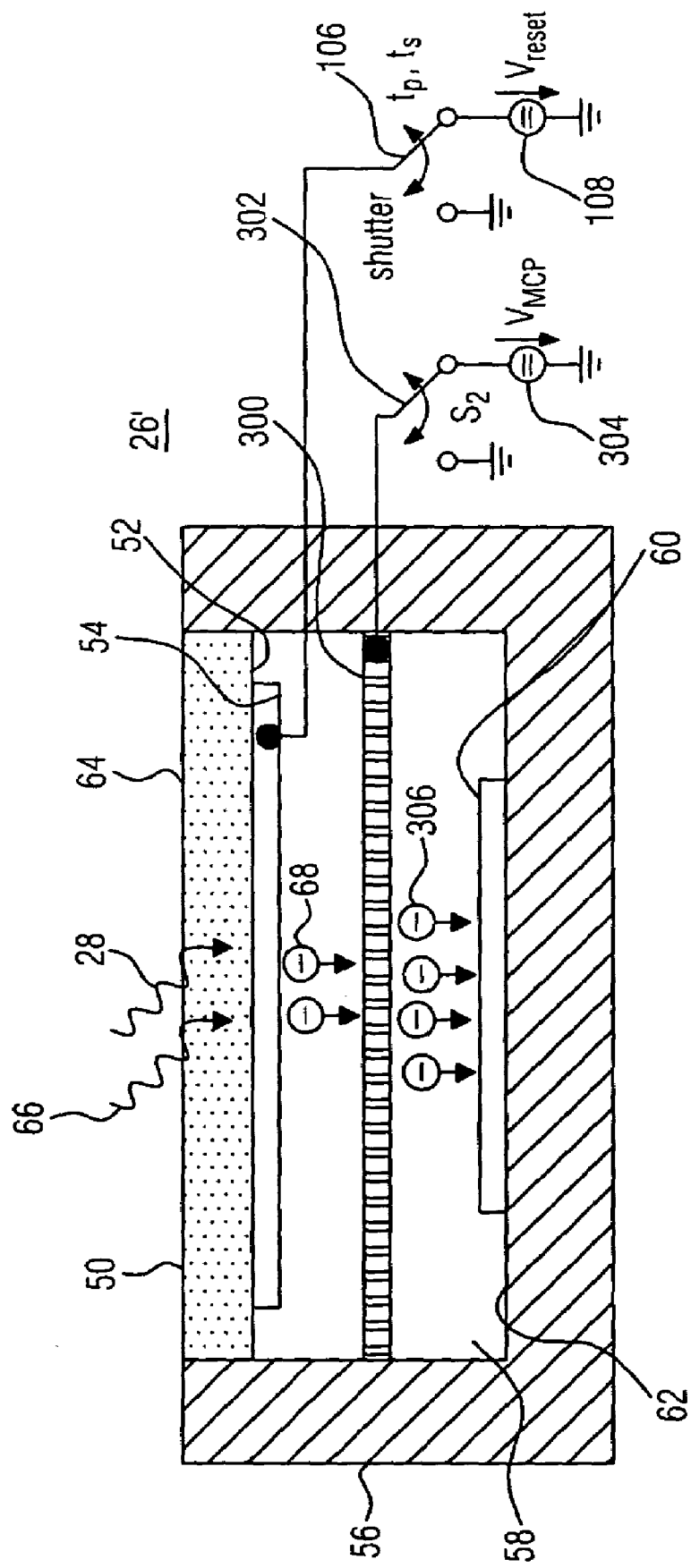
FIG. 4 is a schematic sectional view having control electronics of detection means for the distance sensor of FIG. 1 according to another embodiment of the present invention.

The detection means changed with regard to FIG. 2 is illustrated in FIG. 4 by 26'. It basically has an identical setup to that of the detection means of FIG. 2, except that an electron multiplier in the form of an MCP (micro channel plate) 300 is disposed in the high vacuum 58 between the photocathode 54 and the semiconductor substrate 60. Also illustrated in FIG. 4 is the switch 106 which, in a way controlled by the control signal shutter, provides for in detection durations of the length $t_S$ and $t_P$, respectively, an acceleration voltage to be applied between the semiconductor structure 60 and the photocathode 54 and not so in between. For the MCP 300, there is a switch 302 controlled by a control signal $S_2$ which is also generated by the control means 110 which in FIG. 4, however, is not shown for reasons of clarity. In a way controlled by the control signal $S_2$, the switch 302 optionally switches the MCP 300 either to ground or biases same to a potential $V_{MCP}$, as is generated by a direct voltage source 304 connected between ground and a respective switch terminal of the switch 302.

The electron multiplier 300 in the form of the MCP has the effect that, when the voltage $V_{MCP}$ is applied to the MCP 300, the photoelectrons 68 emitted by the photocathode 54 and accelerated towards the counterelectrodes of the semiconductor structure 60 impinge on the MCP 300 which thereupon outputs, for each electron, a multiple corresponding to the voltage $V_{MCP}$ or number of secondary electrons 306 corresponding to the voltage $V_{MCP}$. The dependence of the number on the voltage $V_{MCP}$ results from the greater acceleration of the primary electrons 68 at greater a voltage $V_{MCP}$.

Figure 5:
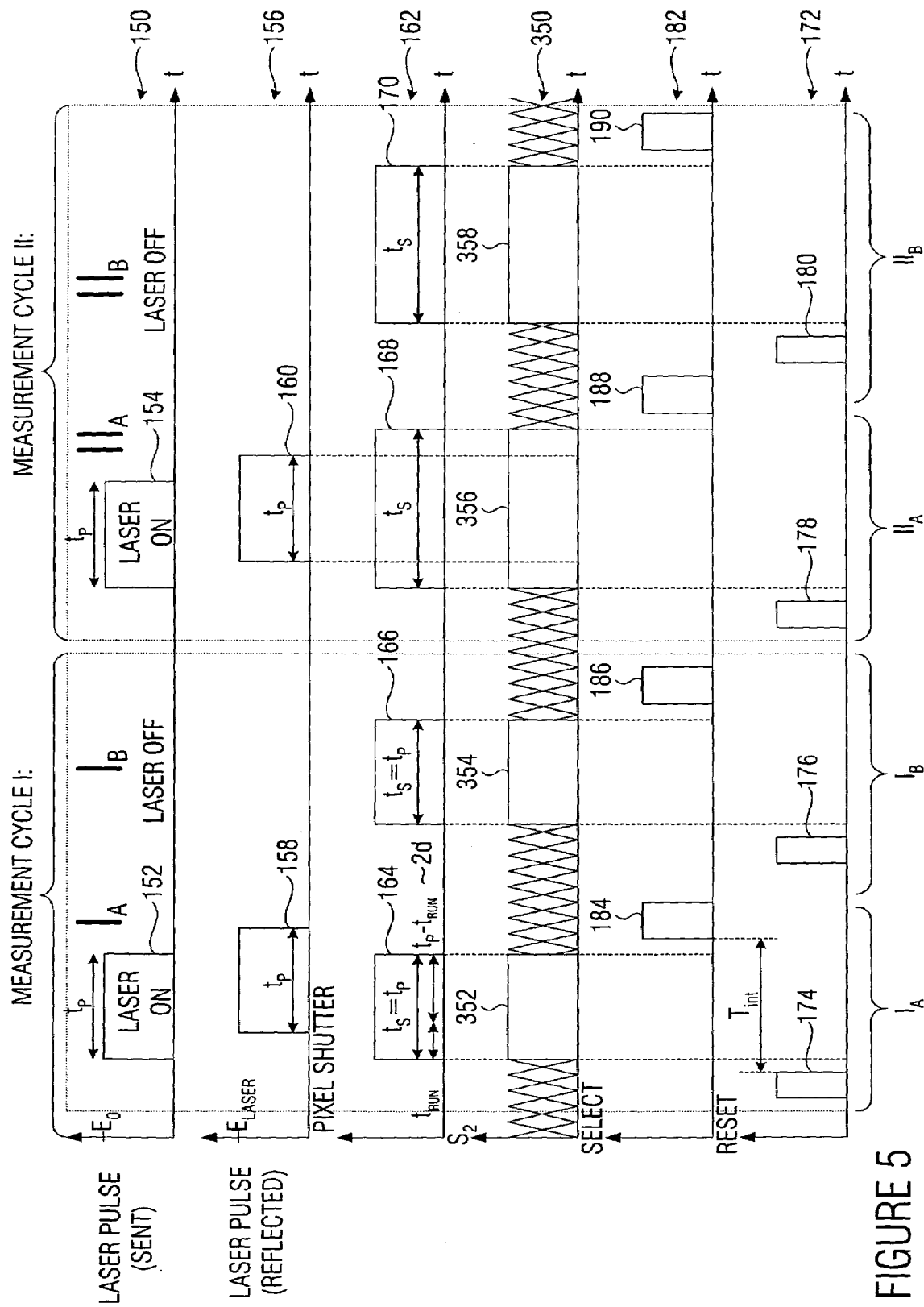
FIG. 5 shows exemplary time waveforms occurring in the distance sensor of FIG. 1 using the detection means of FIG. 4 according to an embodiment for a measuring cycle including background radiation correction and reflectance correction.

The secondary electron multiplier 300 in the form of the MCP may also be used as a "photo" gate having a shutter function, as will become clear from FIG. 5. FIG. 5 illustrates an embodiment of a measurement flow corresponding to that of FIG. 3, but differing from that of FIG. 3 in that the detection means or image enhancer 26' of FIG. 4 is used in the distance sensor of FIG. 1 instead of the detection means 26 of FIG. 2. FIG. 5 illustrates the measurement flow corresponding to FIG. 3 by time waveforms of signals. Same reference numerals are used in the time waveforms where the measurement flow according to FIG. 5 matches the measurement flow of FIG. 3. As can be recognized, the measurement flow matches in the signals reset, select, shutter and in the laser driving. In FIG. 5, the discharge behavior resulting at the pixels is not illustrated since it basically corresponds to that of FIG. 3 or only manifests itself in a higher gradient of the discharge curve since each primary electron 68 results in one or several secondary electrons 306.

In a timing diagram 350, FIG. 5, however, shows the time waveform of the signal $S_2$ by means of which the switch 302 is driven. When the signal $S_2$ at 350 is on the x-axis, the switch 302 is in the position not illustrated in FIG. 4 so that the MCP 300 is blocked. At the other points in time which at 350 are indicated by the signal S2 being remote from the x-axis and which in FIG. 5 are indicated by 352, 354, 356 and 358, the switch 302 is in the position illustrated in FIG. 4 so that the voltage 304 is applied to the MCP 300. The points in time 352–358 when the voltage $V_{MCP}$ is applied to the MCP 300 match the detection time windows 164–170 or are simultaneous to same. The MCP 300 thus acts as a "photo" gate having a shutter function. When the switch $S_2$ is in the position "ground", the MCP 300 is blocked, the electron flow to the semiconductor structure 60 which exemplarily is a CMOS sensor is interrupted. In the position "$V_{MCP}$", the enhancement is set by adjusting the voltage $V_{MCP}$. MCPs comprise enhancements of 1:1 million or more. Correspondingly, $V_{MCP}$ may, depending on the design of the image enhancer module, be 10 volts or more. In an enhancement $k_{MCP}$ of the MCP 300, $k_{MCP}$ electrons 306 at the output, i.e. on the side of the MCP 300 facing the semiconductor substrate 60, are generated from an electron 68 at the input of the MCP 300, i.e. at the side of the MCP 300 facing the photocathode 54, and detected by the pixel structures in the semiconductor substrate 60. Thus, the noise portions of the semiconductor substrate 60 exemplarily implemented as a CMOS sensor and of the entire distance measuring system 10 are reduced in a first approximation by the factor root($k_{MCP}$) in the measurement result.

The noise of the background light is determined by the temporal duration of the signal shutter, i.e. by $t_P$. The shorter $t_P$, the smaller the portion of the background light noise in the measurement signal. The multiple-pulse method could be used for a further noise reduction.

With regard to the above description, it is pointed out that it has not been explained in particular that the photocathode 54 may be "sensitive" for a wider spectrum or may output photoelectrons to a wider spectrum than the spectrum of the radiation source 12 used. This is why, according to an embodiment of the present invention, the photocathode 54 is formed by a semiconductor material which is doped by special foreign atoms. By specially selecting the foreign atoms, the photocathode 54 is only sensitive in very narrow wavelength regions or only outputs photoelectrons in these very narrow wavelength regions, which then should lie within the spectrum of the light source 12 or overlap same. The selectivity achieved by this may even be better than in optical filters which, however, might also be used here, for example when they at the same time serve as the input window 50.

Figure 6:
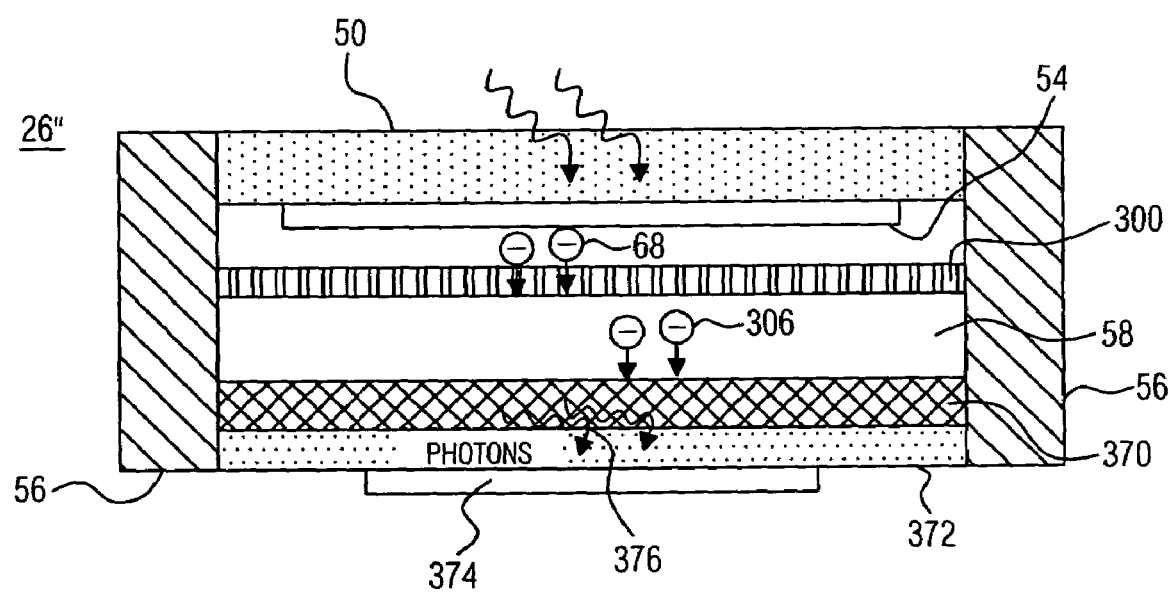
FIG. 6 is a schematic sectional view of detection means for the distance sensor of FIG. 1 according to another embodiment of the present invention.

FIG. 6 shows an image enhancer 26" varied compared to FIG. 4. The image enhancer of FIG. 6 basically differs from that of FIG. 4 in that the casing 56 does not only comprise a front opening sealed by the input window 50, but that same is also open on the opposite side. The opening on the opposite side is sealed by a layer sequence of photoscreen 370, output window 372 and semiconductor structure 374, forming the bottom of the casing 56. The input window, the casing 56 and the output window 372 in turn form a vacuum chamber 58.

In contrast to the embodiments of FIGS. 2 and 4, the photoelectrons 68 ejected from the photocathode 54 or the secondary electrons generated by the MCP 300 are not detected directly, but there is another transformation of the electron stream to a photon stream by transforming the secondary electrons 306 output by the MCP 300 in the phosphor screen 370 exemplarily vapor-deposited on the output window 372 on the side facing the MCP 300 thereof back to photons 376 which then reach a CCD or CMOS photodiode array formed in the semiconductor structure 374 through the output window 372. Behind the phosphor screen 370, there may optionally also be glass fiber optics which guides the light or photon stream to a CCD or CMOS image sensor 374 arranged at a different position. With corresponding shutter or detection time window settings, the same measurement flows like in FIG. 5 may be realized with the image enhancer 26".

It is pointed out that the distance sensor 10 may also form a 3D camera which, apart from the 3D image capture function described before, also has the ability of generating normal image shots, i.e. 2D image shots, so that colored or black and white images may be generated.

Figure 7:
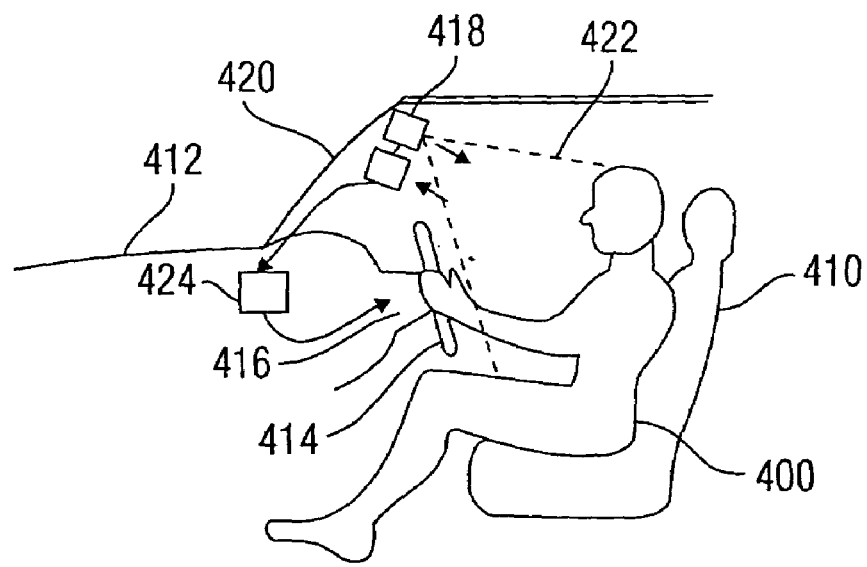
FIG. 7 is a schematic view of the distance sensor of FIG. 1 when being used for airbag triggering according to an embodiment of the present invention.

FIG. 7 shows a way in which the distance sensors described before may be employed. FIG. 7 illustrates a car driver 400 while driving. He or she sits on the driver's seat 410 and steers a car 412 via a steering wheel 414 in which an airbag 416 is installed ready to be triggered. The distance sensor, which may be formed according to one of the previous embodiments, is indicated by 418 and is illustrated as being mounted above the windshield 420, wherein, however, different positions are also conceivable. The distance sensor 418 generates a 3D image shot or 3D image shot sequence of an image section illustrated by broken lines 422, which includes the driver 400. The 3D image information reach an evaluation unit 424 continuously examining the distance images $d_{x,y}$ as to how close the driver 400 is to the sensor 418, which may, for example, then be taken as a measure of how close the driver 400 is to the airbag 416. The evaluation means 422 for example calculates the spatial volume between the sensor 418 and the driver 400 in the detection space angle segment and uses this as a measure of the distance between the driver 400 and the airbag 416. In the case of a collision or accident, the evaluation means 424 drives the airbag 416 such that the airbag 416 is triggered with an offset intensity in dependence on the distance of the driver 400, i.e. later when the driver 400 is farther away from the airbag 416. The case schematically illustrated in FIG. 7 is only exemplary. Of course, the 3D sensor 418 may also be used for triggering the airbag of a second airbag or an airbag for a different passenger than the driver 400. In addition, the assembly between sensor 418, driver 400 and airbag 416 may be chosen to be different.

Figure 8:
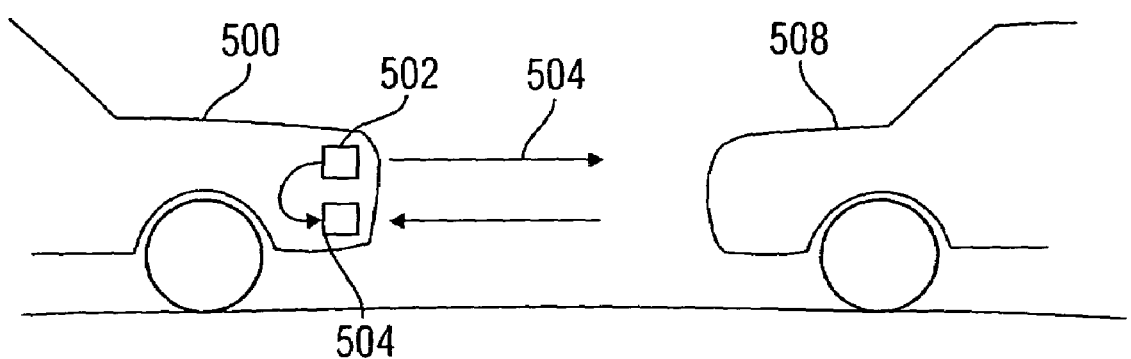
FIG. 8 is a schematic view of the sensor of FIG. 1 when being used for distance control in motor vehicles according to an embodiment of the present invention.
Figure 9:
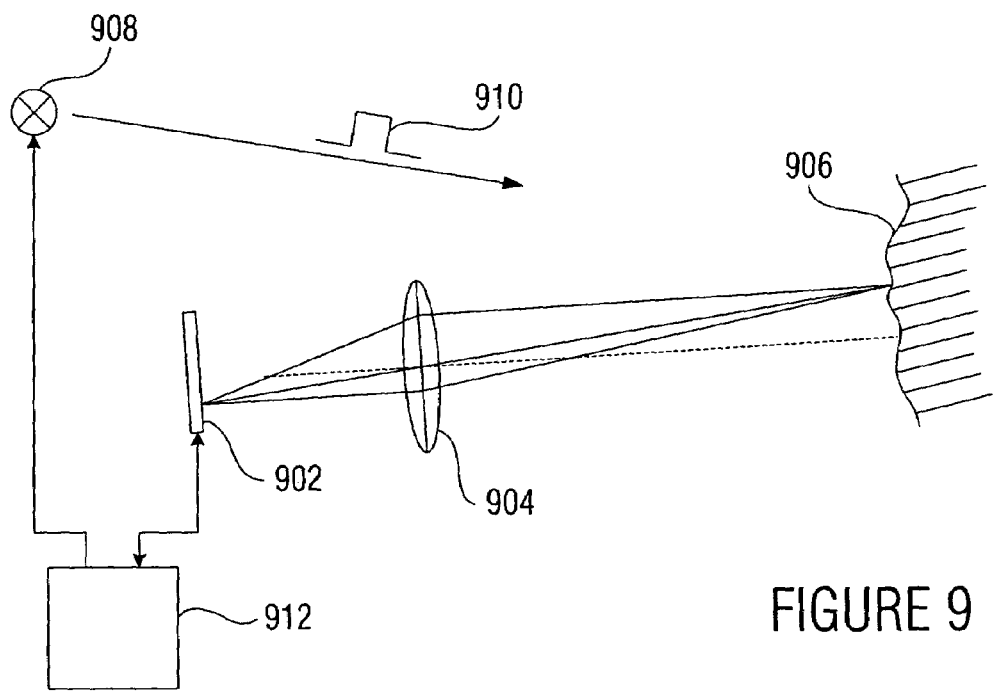
FIG. 9 shows a schematic drawing for illustrating the principle of 3D distance measurements by means of a pulsed illumination and short exposure time.
Figure 10:
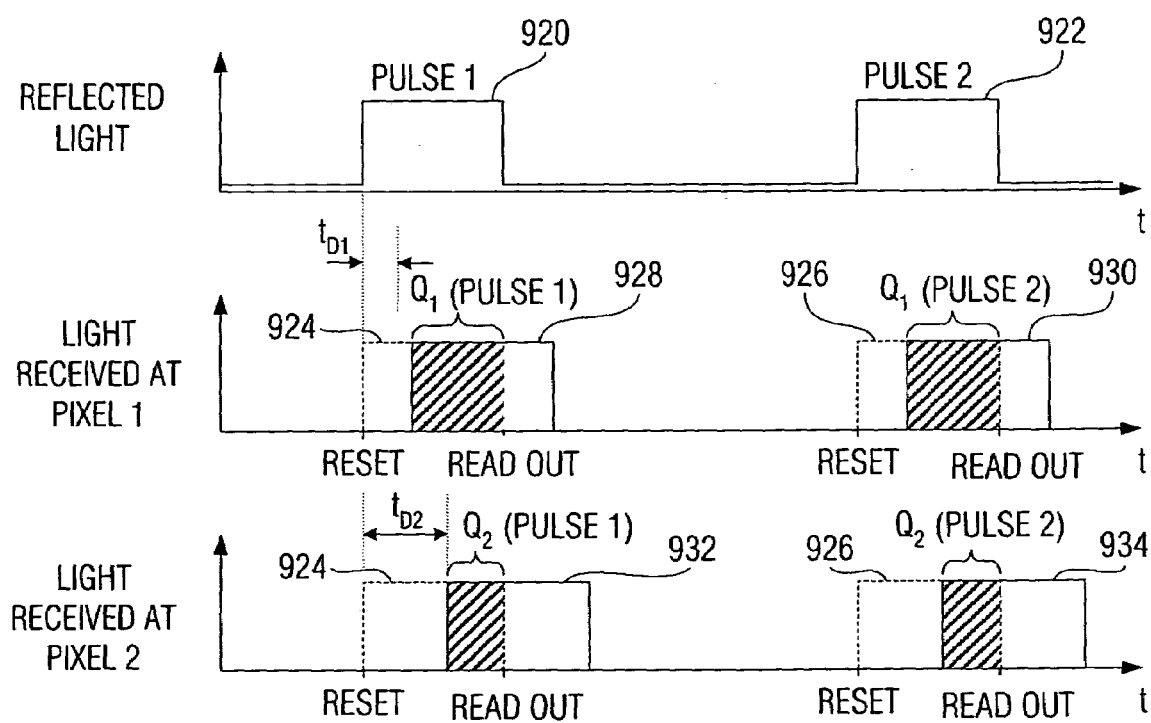
FIG. 10 shows time waveforms illustrating the presence of light at the light source and two different pixels of the pixel sensor, for illustrating the realization of the measuring principle of FIG. 9

FIG. 8 shows another embodiment in which a distance sensor according to FIGS. 1–6 might be employed. FIG. 8 shows a car 500 at the front part of which the 3D sensor 502 is attached to generate 3D image shots in the direction 504 in which the car 500 is driving. Evaluation means 504 receives the image information and determines, using same, whether there is a car in front of the car 500 in the driving direction 504 and, when this is the case, which is illustrated in FIG. 8 by a car 508, whether it is closer than an allowed minimum distance in front of the car 500, in which case the evaluation means 506 for example outputs a signal to the driver or reduces the engine power or actively decelerates the car 500.

In both fields of application of FIGS. 7 and 8, the 3D sensor 418 and 502, respectively, may be adapted easily to the respective problems in the individual case. In the case of FIG. 7 and FIG. 8, the preferred wavelength range in which the light source emits light, i.e. the spectrum of the light source, is from 900 nm to 1200 nm and, more preferably, from 1500 nm to 200 nm. This operating wavelength range prevents danger to the eye of the driver 400 in the case of FIG. 7 and excludes malfunctioning due to fog or rain in the distance control according to FIG. 8.

It is pointed out that above embodiments may be varied in different regards. The electrons 68 generated in a photoelectrical way, for example, may be detected in a different manner from what is illustrated in the embodiments of FIGS. 2, 4 and 6. Thus, additional electrodes might be arranged in the pixel, which surround the actual detecting electrode and focus the electrode beam to the pixel center by selecting corresponding potentials. Additionally, the present invention would also be conceivable as a simple distance sensor where there is practically only one pixel. The array itself could be arranged in a different manner than in columns and lines. Additionally, different variations might be employed with regard to the synchronization between detection time windows and illumination time windows. For example, the lengths of these time windows in the actual distance-detecting cycle $I_A$ need not necessarily be equal. $t_P$ in $I_A$, for example, might also be greater or smaller than the detection duration $t_S$, as long as cutting off the one or the other window only results in the relevant distance regions. Furthermore, a time offset which for the minimum distance d should be smaller than $t_{run}$ might be provided between the detection time window and the associated illumination time window. The evaluation means not shown before might be implemented, together with the control means 110, by means of a micro controller and corresponding software.

The above embodiments thus represent a detection principle where a detector structure is able of shifting the wavelength of the pulse light from the visible range, solving the problem of eye protection. The shutter time windows might be shortened, which is how the background light portion is minimized, and the energy of the light pulse occurring might be enhanced, which is how the pulse number can be reduced in multiple accumulation. In addition, above embodiments allow a distance measurement in a locally highly resolved form since, due to the electron multiplication, the pixels may be designed to be much more sensitive and thus smaller compared to existing 3D pixels the sensitivity of which directly depends on the light-sensitive area of the photodiode.

Above embodiments use image enhancers as sensor elements, and no photodiodes. The image enhancers may also be operated at long-wave pulse light outside the visible range. Thus, the requirements to eye protection are eased, since for light wavelengths not visible to the human eye, much higher pulse energies may be used for measuring the distance. In addition, certain liquid media, such as, for example, blood, tissue water, fog, humidity, smog and the like, are transparent for long-wave light in the micrometer wavelength range. Here, new fields of application open up for 3D distance measuring sensor technology and the image shots using long-wave light. Specifically, motor vehicle distance cameras, for example, would be able in fog or rain situations to keep a safe distance to the vehicle in front.

Today's 3D measuring systems operating with visible laser light with a wavelength of about 900 nm would require much higher a pulse power to be able to reliably determine the distance, which is prohibitive for reasons of eye protection.

Due to the shutter times which may be set to be much shorter in photocathodes down to the picosecond range, the background light portion in the measurement signal is minimized. When the laser energy apportioned to the width of the shutter window is kept constant by increasing the pulse power emitted, the signal-to-noise ratio between the laser and background lights increases. In comparison to applications known so far (shutter times in nanosecond range), the improvement in the signal-to-noise ratio is determined by the ratio of the shutter times. When using an image enhancer having a secondary electron multiplier (MCP), the energy of the electrons generated from the light pulse is again additionally enhanced in the module, which increases the signal-to-noise ratio to the noise of the sensor/system electronics. In summary, it is stated that the noise of the background light is reduced and the signal-to-noise ratio with regard to the sensor system is increased by means of the signal processing method presented here.

The distance values captured with image enhancers are, laterally, in a much higher resolved form since the edge length of the pixel, depending on the process, is less than 10 μm due to the metal electrode which may be designed to be very small. In a 0.5 μm standard CMOS manufacturing process, very large matrices having 1 million or more pixels can thus be realized. In comparison, with existing 3D pixels, only up to about 1000 pixels having an edge length of 200–300 μm can be integrated since the sensitivity thereof directly depends on the light-sensitive area of the photodiode. The lateral resolution obtainable thus is many times smaller than in the switching principle suggested in the above embodiments. Here, varied applications open up in the range of professional photography, movie/television, studio or recording technology, monitoring sensor technology, in smart office applications, etc.

Among other, medicine technology also offers a number of ways in which the above embodiments may be utilized. Due to the fact that high wavelengths of the laser light may be used, video endoscopes may be maneuvered through, for example, blood vessels in an anti-glare and absorption-free manner, since blood is transparent for long-wave light. For signal transmission, the embodiment of FIG. 6 may, for example, be used when same is extended to include a light guide between the phosphor screen and the semiconductor substrate. Thus, surgery techniques on pulsing organs would be possible since the camera system would no longer be irritated by the flow of tissue liquid or blood.

In particular, it is pointed out that, depending on the circumstances, the inventive scheme for measuring a distance might also be implemented in software. The implementation may be on a digital storage medium, in particular on a disc or CD having control signals which may be read out electronically, which can cooperate with a programmable computer system such that the corresponding method will be executed. In general, the invention also is in a computer program product having a program code stored on a machine-readable carrier for performing the inventive method when the computer program product runs on a computer and/or a corresponding digital or analog element. In different words, the invention may also be realized as a computer program having a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. A distance sensor for detecting a distance to an object point, comprising:
    an electromagnetic radiation source for irradiating the object point by a radiation pulse in an irradiation time window;
    a detector for detecting electromagnetic radiation reflected from the object point in a detection time window which is in a predetermined temporal relation to the irradiation time window, wherein the detector comprises:
        a photoelectrode for, in accordance with the external photoeffect, emitting photoelectrons responsive to the reflected electromagnetic radiation; and
        an electron detector for transforming the photoelectrons emitted to a detection signal indicating a quantity of the electromagnetic radiation reflected from the object point; and
    an evaluator for determining the distance to the object point from the detection signal, the detector further comprising:
        a counterelectrode which, together with the photoelectrode, forms a capacity;
        a connector for connecting the counterelectrode to a predetermined potential before the detection time window and for separating same from the predetermined potential during the detection time window such that the capacity is discharged during the detection time window;
        a connector for connecting the photoelectrode to ground during the detection time window and to the predetermined potential after the detection time window; and
        a reader for reading out a voltage across the capacity after the detection time window to obtain the detection signal.

2. The distance sensor according to claim 1, wherein the electron detector comprises:
    an electron multiplier for outputting a number of secondary electrons responsive to the photoelectrons output, wherein the number of secondary electrons correspond to a multiple of a number of the photoelectrons; and
    an electron accumulator for accumulating the secondary electrons within the detection time window; and
    a circuit for generating the detection signal in dependence on the secondary electrons accumulated within the detection time window.

3. The distance sensor according to claim 2, wherein the electron accumulator includes a counterelectrode which, together with the photoelectrode, forms a capacity, the electron multiplier being arranged between the counterelectrode and the photoelectrode.

4. The distance sensor according to claim 2, wherein the electron multiplier is controllable to output in a first state no secondary electrons and to output in a second state a multiple of the photoelectrons to secondary electrons, and further comprising:

a controller for controlling the electron multiplier to put same to the second state during the detection time window and to the first state before and after.

5. The distance sensor according to claim 1, further comprising:
a filter for bandpass-filtering the reflected electromagnetic radiation before being detected by the detector to weaken electromagnetic radiation in the reflected electromagnetic radiation with a wavelength outside a spectrum of the electromagnetic radiation source.

6. The distance sensor according to claim 1, wherein the photoelectrode is doped with foreign atoms such that the photoelectrode will output photoelectrons only responsive to electromagnetic radiation in a spectral section from a spectrum of the reflected electromagnetic radiation, which at least partly overlaps a spectrum of the electromagnetic radiation source.

7. The distance sensor according to claim 1, further comprising:
a controller for cyclically driving the radiation source and the detector such that in a first cycle a length of the detection time window equals a length of the irradiation time window and in a second cycle a length of the detection time window is greater than the length of the irradiation time window, the evaluator being formed to determine the distance to the object point from the detection signal resulting in the first cycle and the detection signal resulting in the second cycle.

8. The distance sensor according to claim 7, wherein the controller is formed to cyclically drive the radiation source and the detector such that the first cycle and the second cycle are repeated, without irradiating the object, in a third and fourth cycles, and the evaluator being formed to use the detection signals resulting in the third and fourth cycles for compensating background radiation of the detection signals of the first and second cycles.

9. The distance sensor according to claim 1, wherein a spectrum of the electromagnetic radiation source is from 400 nm to 3 μm.

10. A 3D camera for generating a distance image for detecting a distance to an object point, said 3D camera comprising a plurality of distance sensors, each distance sensor including: an electromagnetic radiation source for irradiating the object point by a radiation pulse in an irradiation time window; a detector for detecting electromagnetic radiation reflected from the object point in a detection time window which is in a predetermined temporal relation to the irradiation time window, wherein the detector includes: a photoelectrode for, in accordance with the external photoeffect, emitting photoelectrons responsive to the reflected electromagnetic radiation; and an electron detector for transforming the photoelectrons emitted to a detection signal indicating a quantity of the electromagnetic radiation reflected from the object point; and an evaluator for determining the distance to the object point from the detection signal, the detector further including: a counterelectrode which, together with the photoelectrode, forms a capacitance; a connector for connecting the counterelectrode to a predetermined potential before the detection time window and for separating same from the predetermined potential during the detection time window such that the capacitance is discharged during the detection time window; a connector for connecting the photoelectrode to ground during the detection time window and to the predetermined potential after the detection time window; and a reader for reading out a voltage across the capacitance after the detection time window to obtain the detection signal, wherein the electromagnetic radiation sources are formed from a common electromagnetic radiation source; an array in which detectors are arranged; and optics for imaging an object onto the array.

11. A method for detecting a distance to an object point, comprising the steps of:
irradiating an object point by a radiation pulse in an irradiation time window;
detecting electromagnetic radiation reflected from the object point in a detection time window which is in a predetermined temporal relation to the irradiation time window, by means of a photoelectrode such that photoelectrons are emitted responsive to the reflected electromagnetic radiation according to the external photoeffect; and
transforming the emitted photoelectrons to a detection signal indicating a quantity of the electromagnetic radiation reflected by the object point; and
determining the distance to the object point from the detection signal, wherein the step of detecting comprises the following substeps:
connecting a counterelectrode which, together with the photoelectrode, forms a capacity to a predetermined potential before the detection time window and separating same from the predetermined potential during the detection time window such that the capacity is discharged during the detection time window;
connecting the photoelectrode to ground during the detection time window and to the predetermined potential after the detection time window; and
reading out a voltage across the capacity after the detection time window to obtain the detection signal.

12. Software encoded in a computer-readable medium for detecting a distance to an object point, and when executed said software operable for: irradiating an object point by a radiation pulse in an irradiation time window; detecting electromagnetic radiation reflected from the object point in a detection time window which is in a predetermined temporal relation to the irradiation time window, by means of a photoelectrode such that photoelectrons are emitted responsive to the reflected electromagnetic radiation according to the external photoeffect; and transforming the emitted photoelectrons to a detection signal indicating a quantity of the electromagnetic radiation reflected by the object point; and determining the distance to the object point from the detection signal, wherein the step of detecting comprises the following substeps: connecting a counterelectrode which, together with the photoelectrode, forms a capacity to a predetermined potential before the detection time window and separating same from the predetermined potential during the detection time window such that the capacity is discharged during the detection time window; connecting the photoelectrode to ground during the detection time window and to the predetermined potential after the detection time window; and reading out a voltage across the capacity after the detection time window to obtain the detection signal, when the software runs on a computer and/or on a corresponding digital or analog element.

* * * * *